United States Patent [19]

Theys et al.

[11] Patent Number: 5,181,456
[45] Date of Patent: Jan. 26, 1993

[54] APPARATUS FOR FORMING BINDERLESS EDIBLE PRODUCTS

[75] Inventors: Ezra Theys, Belmont; Russell G. Taylor, Pleasanton, both of Calif.; Bruce Bertelsen, Rice Lake, Wis.; Albert Oey, San Ramon, Calif.; John Hoyrup, Cupertino, Calif.; Frank Knafelc, Lafayette, Calif.

[73] Assignee: The Clorox Company, Oakland, Calif.

[21] Appl. No.: 847,117

[22] Filed: Mar. 6, 1992

Related U.S. Application Data

[60] Division of Ser. No. 735,585, Jul. 25, 1991, Pat. No. 5,128,163, which is a continuation-in-part of Ser. No. 696,807, May 7, 1992, abandoned, which is a continuation-in-part of Ser. No. 523,762, May 16, 1990, abandoned.

[51] Int. Cl.$^5$ .......................... A23P 1/00; B30B 15/00
[52] U.S. Cl. ........................................ 99/485; 99/517; 100/215; 100/93 P; 425/444
[58] Field of Search ................. 99/485, 517, 450.1; 100/93 P, 215, 219, 226; 425/436 R, 444; 426/514, 303, 524, 615

[56] References Cited

U.S. PATENT DOCUMENTS

| | | | |
|---|---|---|---|
| 3,534,792 | 10/1970 | Orlowski | 99/537 |
| 3,537,494 | 11/1970 | Orlowski | 83/404.4 |
| 3,565,636 | 2/1971 | Hutchings et al. | 426/512 |
| 3,650,765 | 3/1972 | Smadar et al. | 426/516 |
| 3,650,766 | 3/1972 | Smadar | 426/516 |
| 3,761,282 | 9/1973 | Shatila | 540/220 |
| 3,941,538 | 3/1976 | Orlowski | 425/241 |
| 3,956,516 | 5/1976 | Holt et al. | 425/444 |
| 3,976,798 | 8/1976 | Young et al. | 426/524 |
| 4,282,258 | 8/1981 | Forkner | 426/512 |
| 4,351,850 | 9/1982 | Costamagna et al. | 426/302 |
| 4,560,337 | 12/1985 | Chin | 425/288 |
| 4,663,180 | 5/1987 | Padula | 426/512 |
| 4,752,200 | 6/1988 | Bartschke | 425/436 R |

FOREIGN PATENT DOCUMENTS

3429990A1 of 1985 Fed. Rep. of Germany.

OTHER PUBLICATIONS

Ziemba, J. V., "Strides in forming," *Food Engineering* 44 (11) 66–70 (1972).
Anon., "Processes onions take big slice of frozen food market," *Food Sciences and Technology Abstracts*, vol. 2, No. 9 9J899.
Lukas and LaBell, "Fabricated onion rings have homestyle look and mild onion flavor," *FSTA*, vol. 17 (1985) No. 7.

*Primary Examiner*—George Yeung
*Attorney, Agent, or Firm*—Harry A. Pacini

[57] ABSTRACT

This invention relates to an apparatus and a method for forming a formable food mass, comprising food pieces without a binder, in selected shapes; and this invention relates to the apparatus used to prepare the formable food mass without the use of binders, wherein the food pieces are optionally chilled to from about 25° F. to about 35° F. prior to compressing the food pieces into the desired shape; optionally the apparatus has a chilled mold cavity maintained at from about −5° F. to about 5° F. during compression of the food pieces therein.

7 Claims, 10 Drawing Sheets

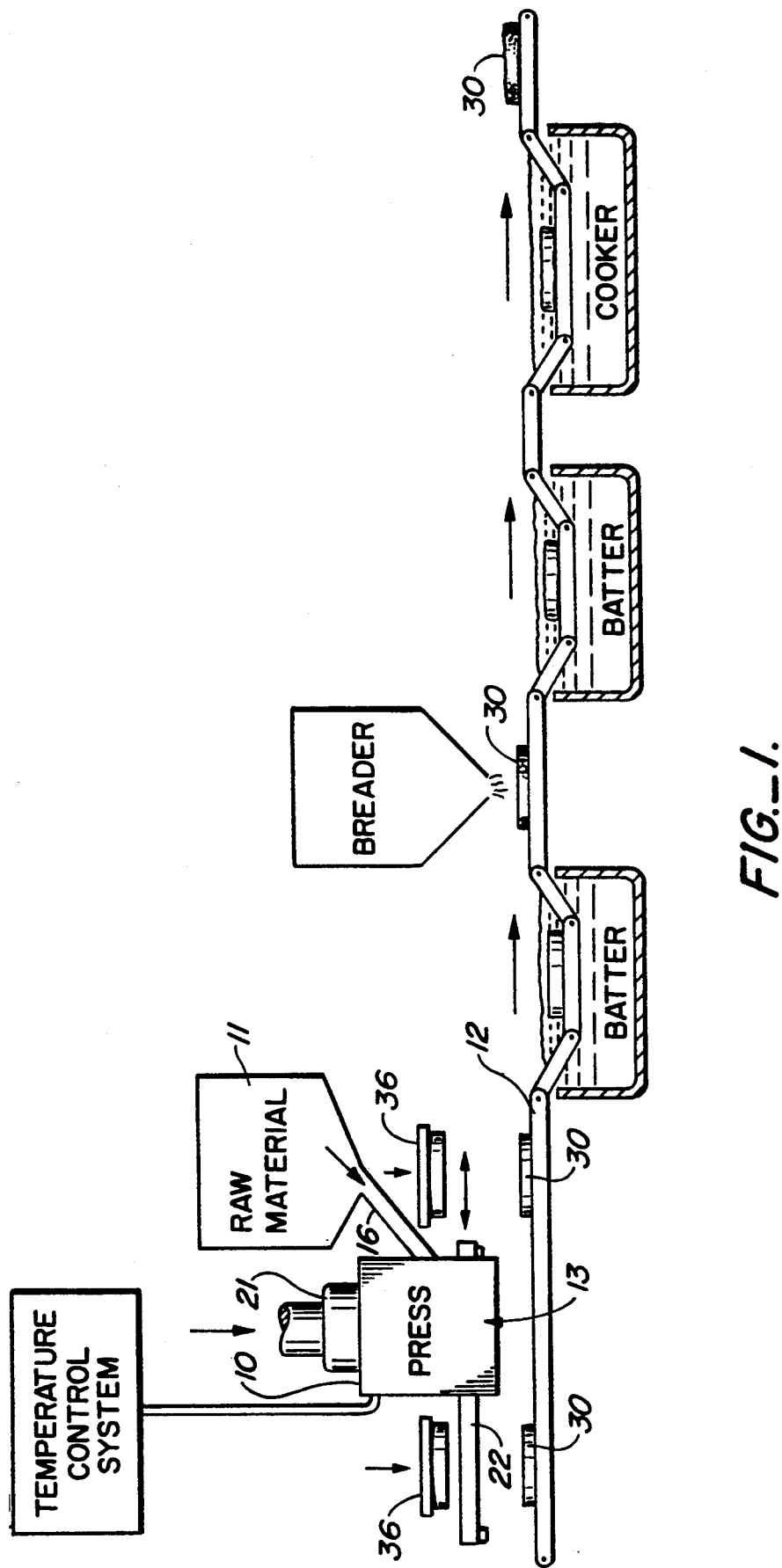
FIG._1.

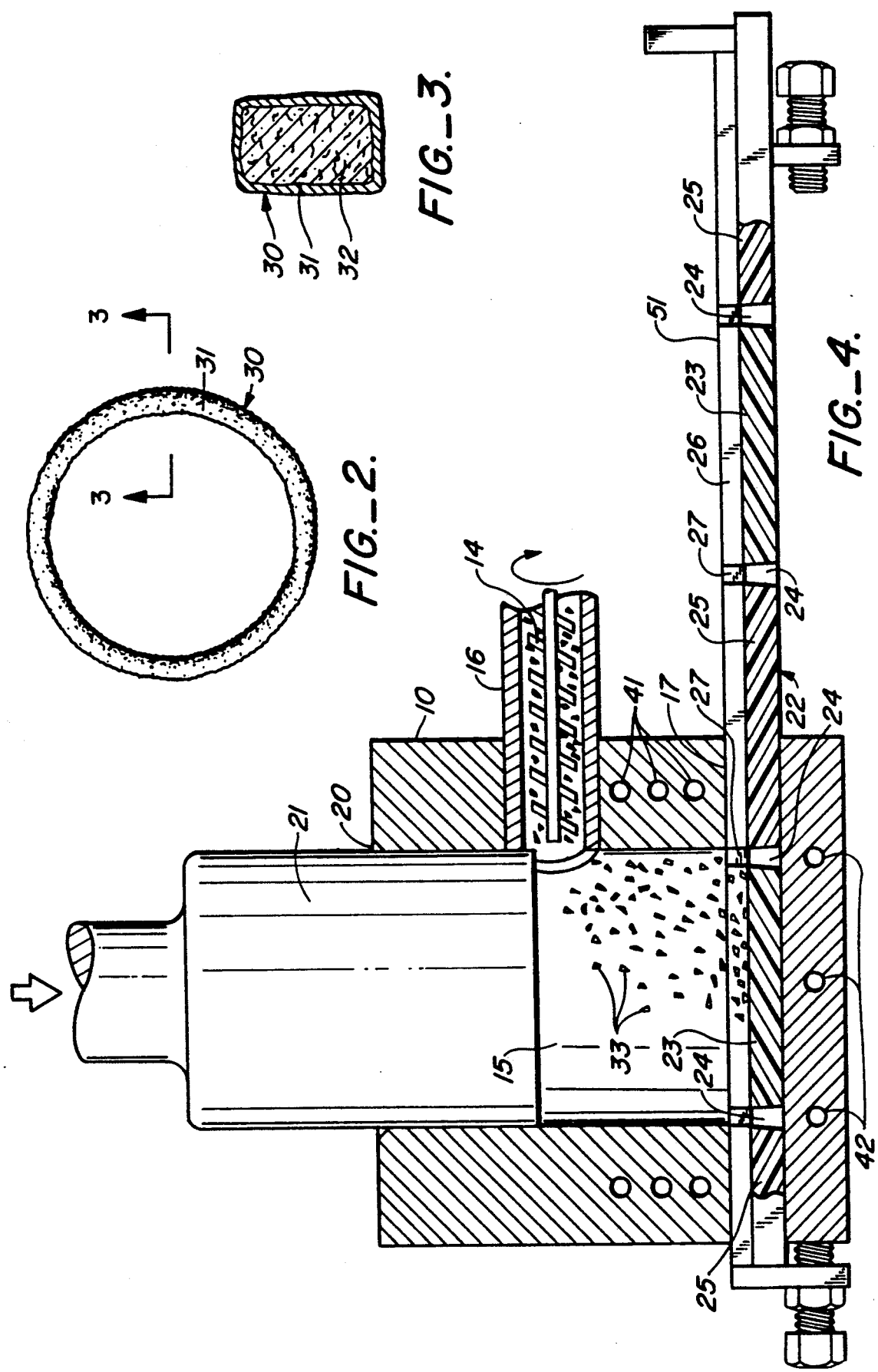

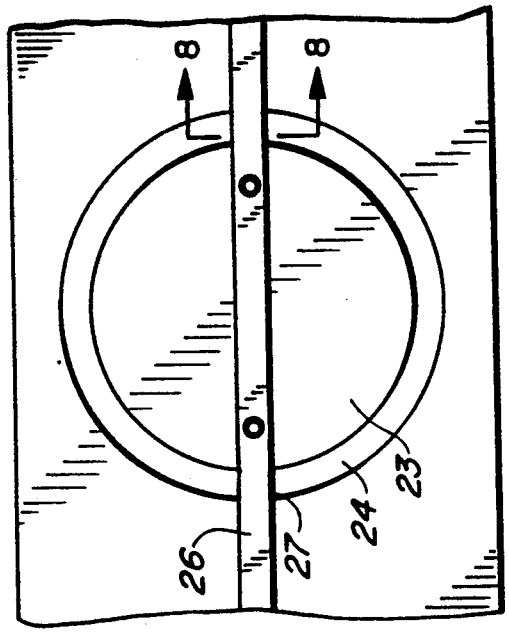
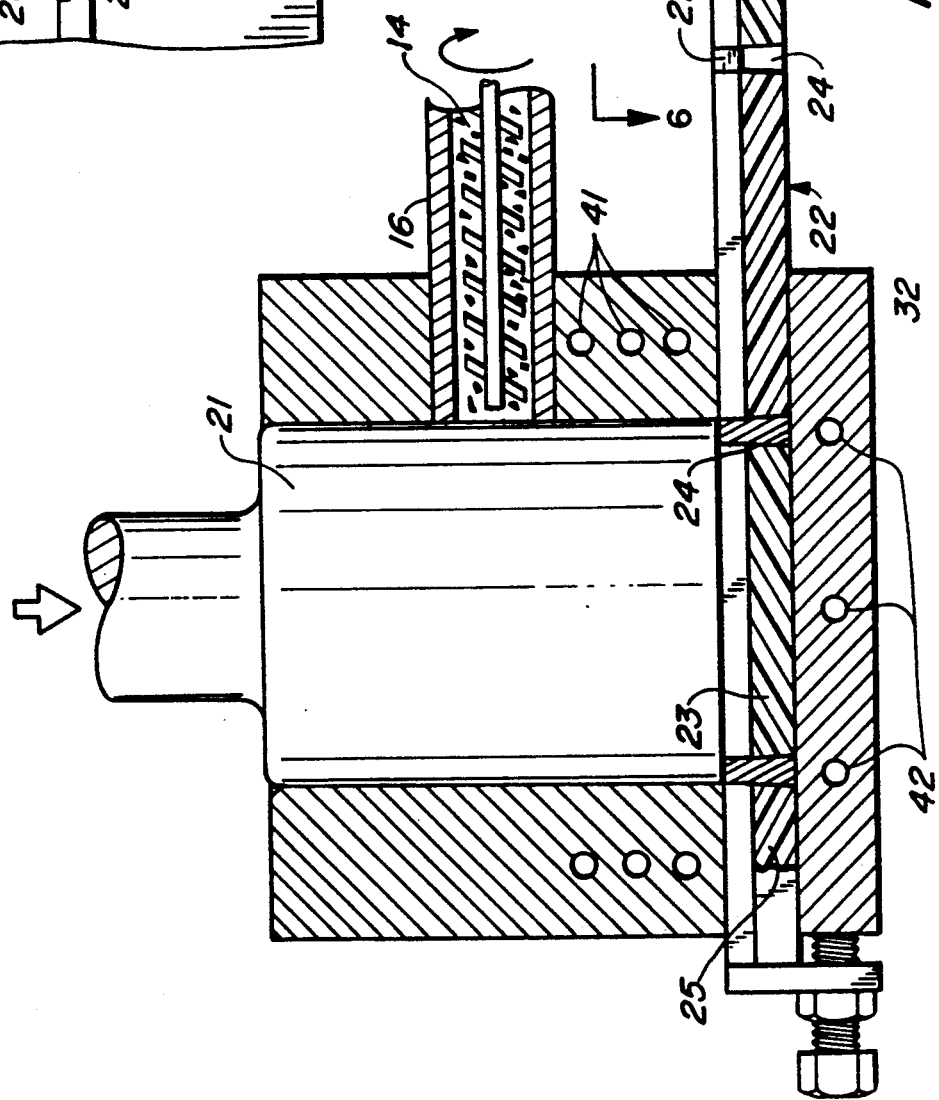
FIG._6.
FIG._5.

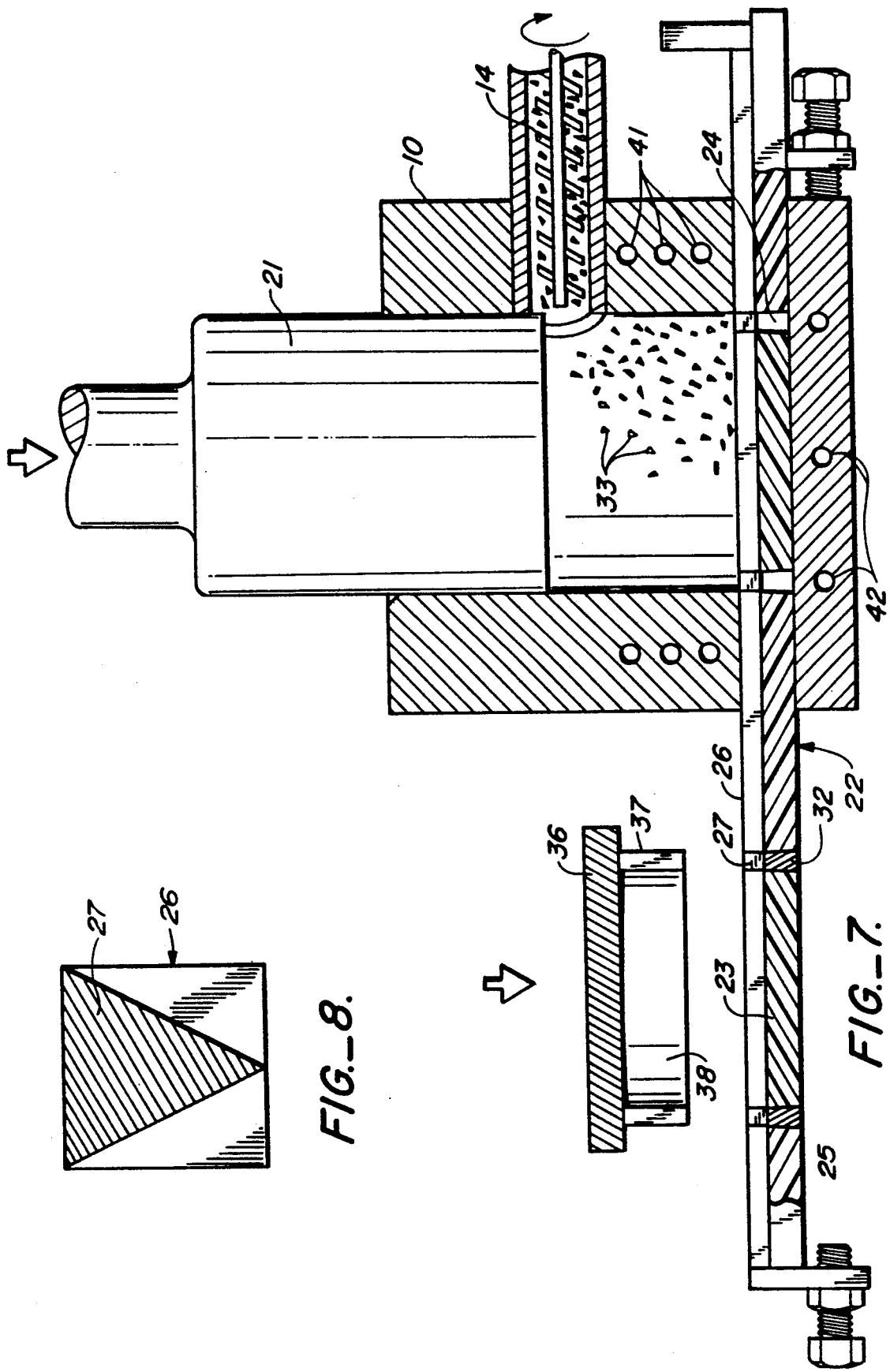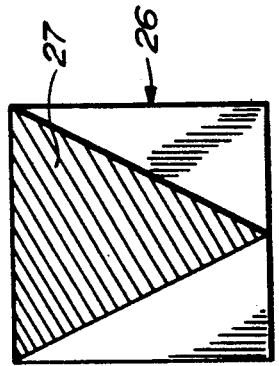
FIG._7.
FIG._8.

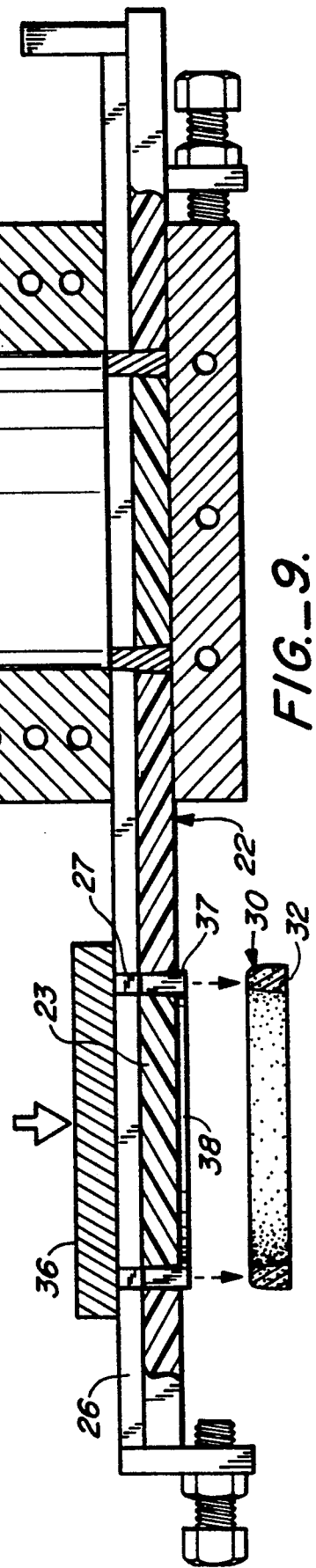
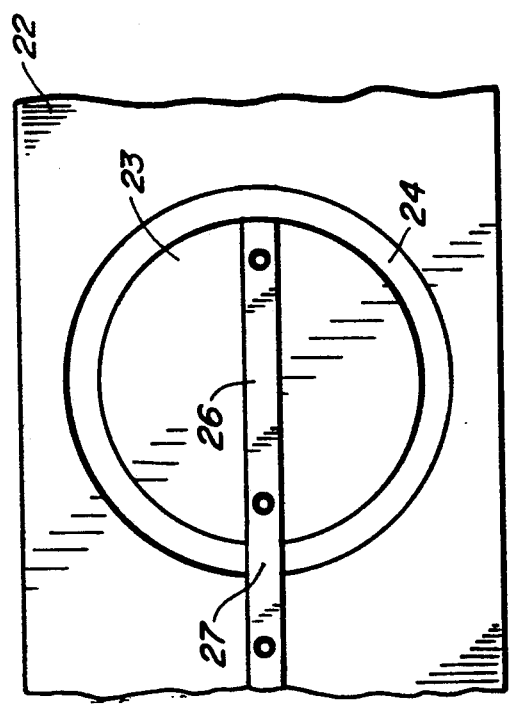
FIG._9.
FIG._10.

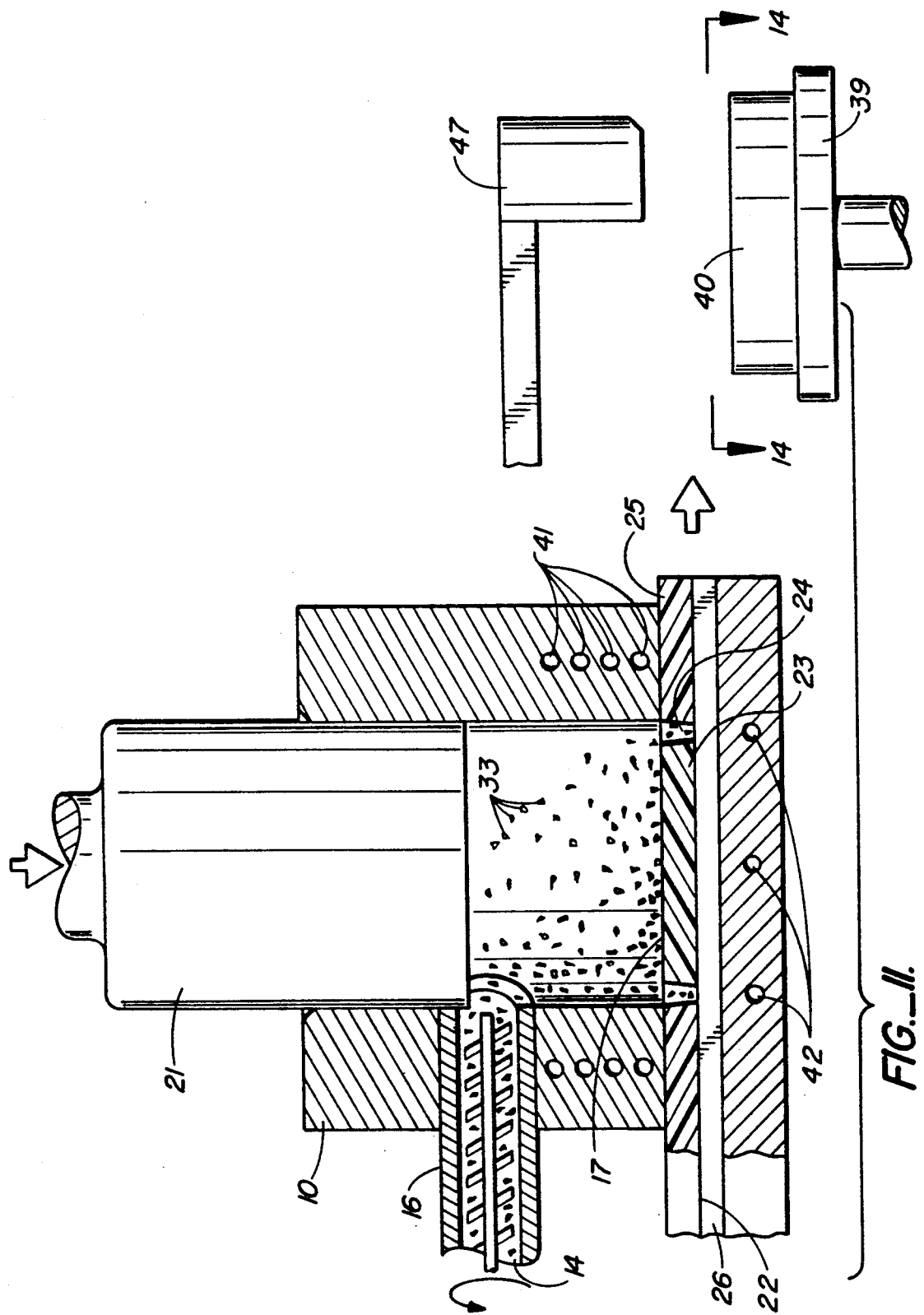
FIG._11.

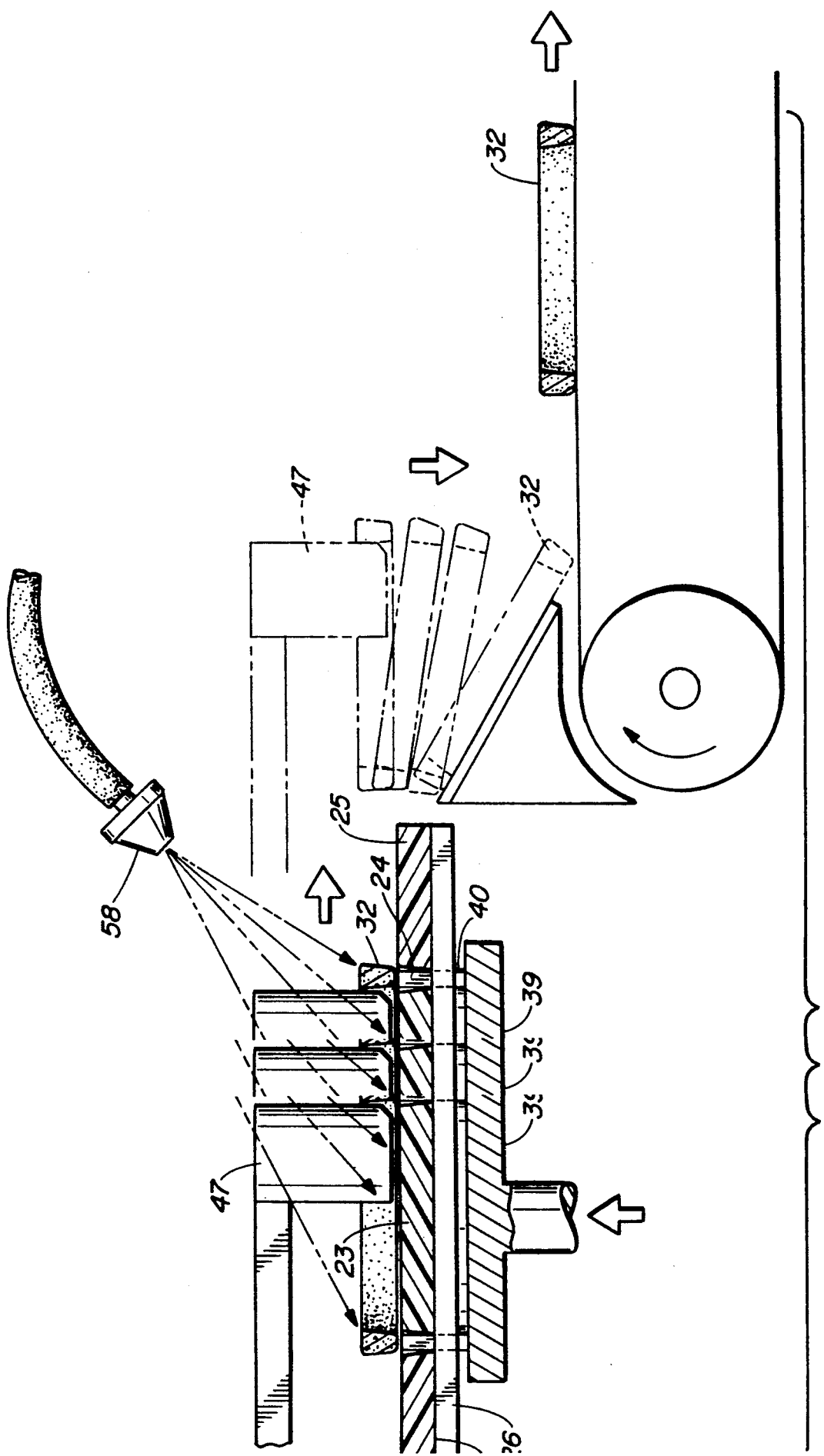
FIG._G._G._12.

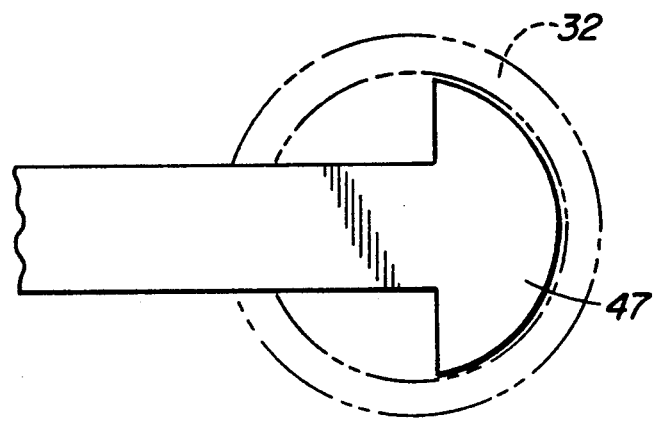
FIG._13.
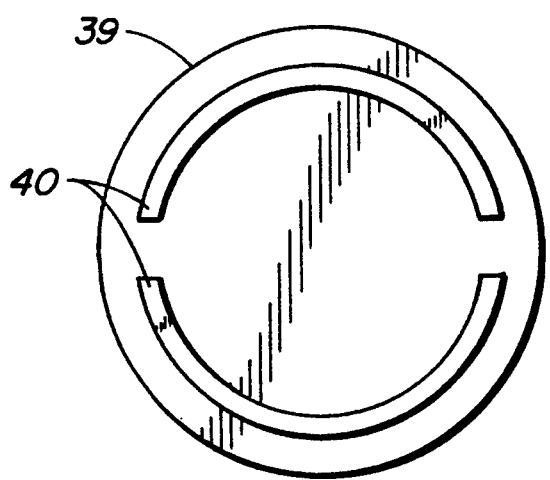
FIG._14.

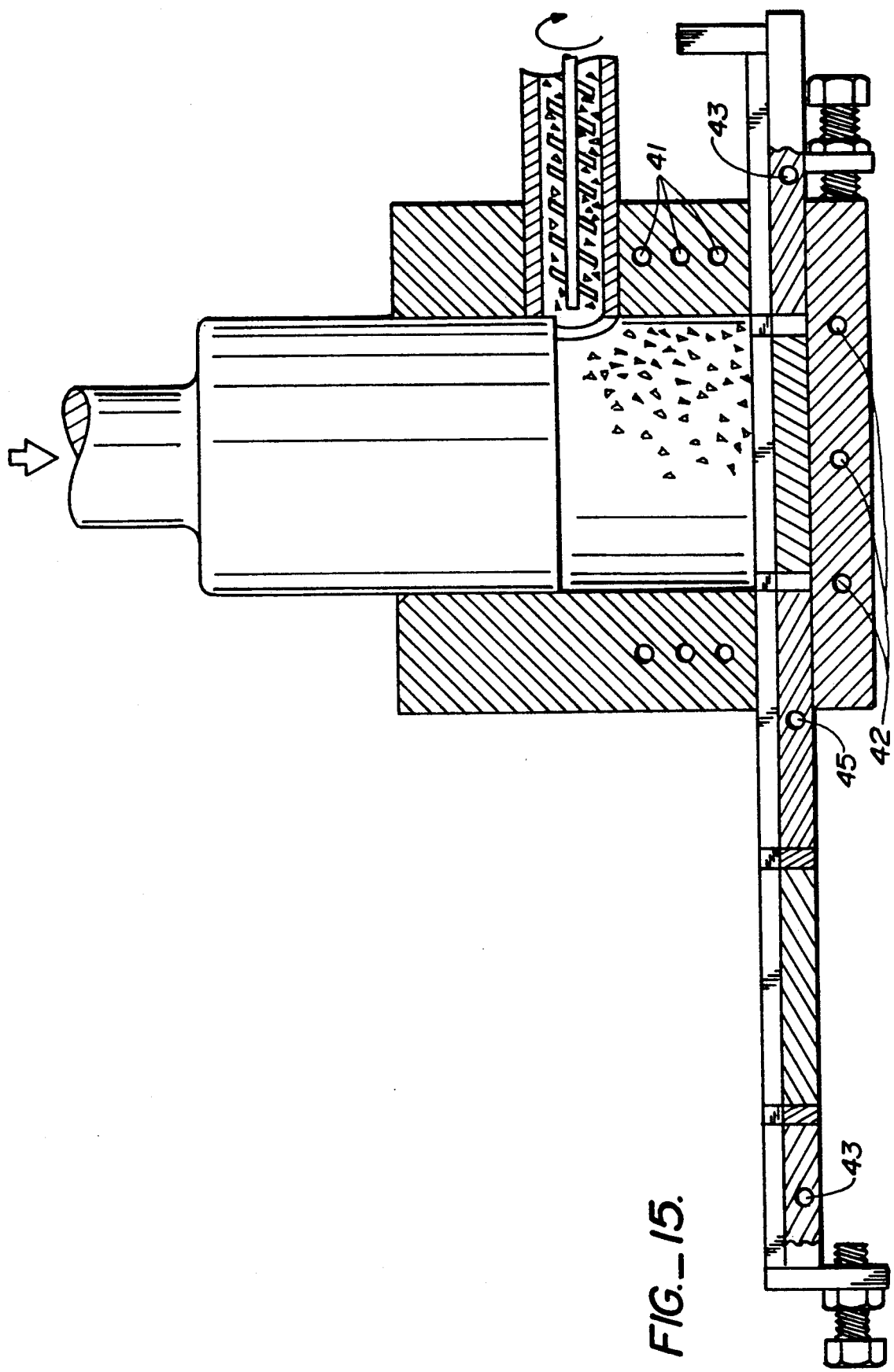
FIG._15.

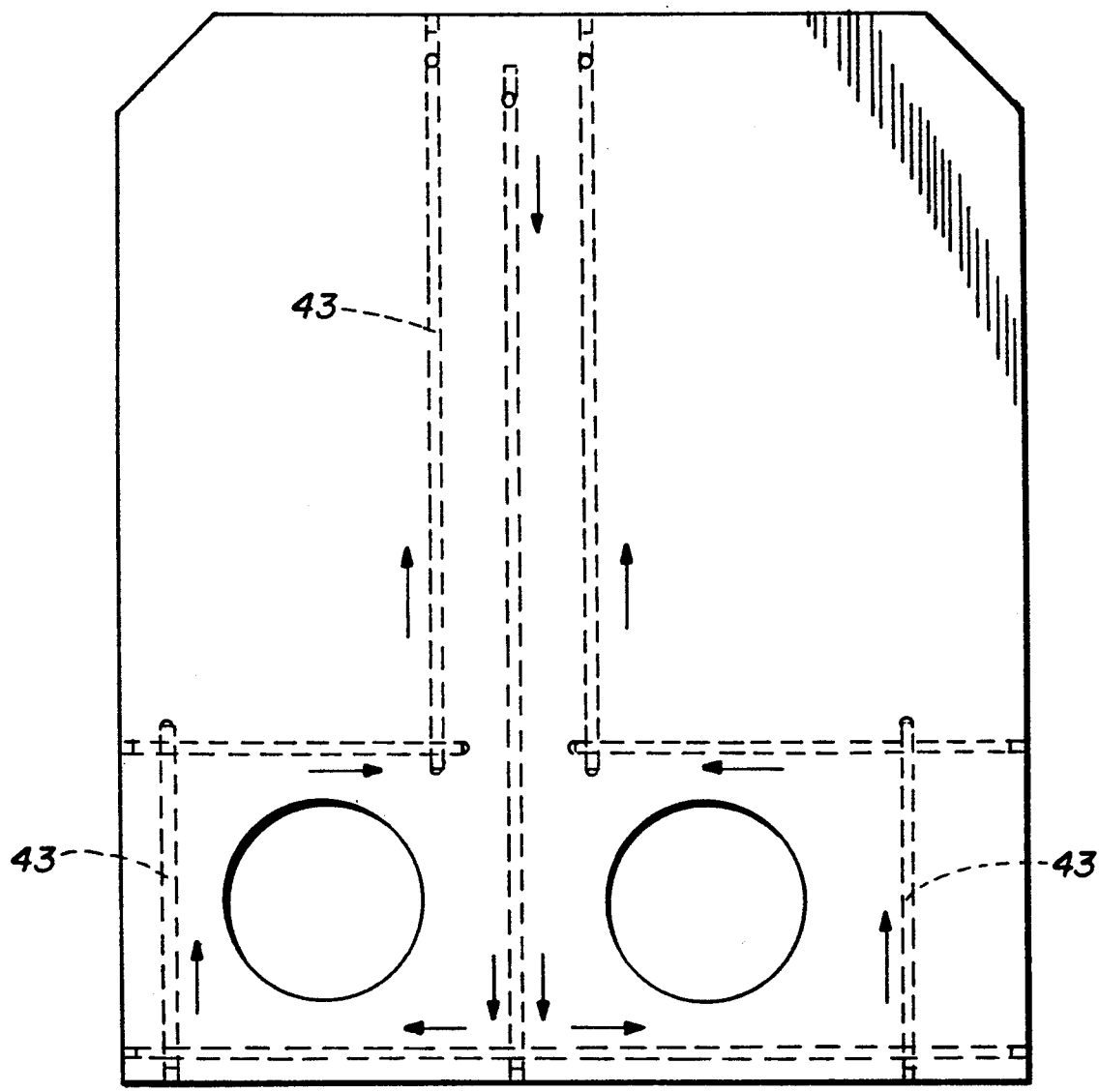
FIG._16.

APPARATUS FOR FORMING BINDERLESS EDIBLE PRODUCTS

CROSS REFERENCE OF RELATED APPLICATIONS

This is a division of application Ser. No. 07/735,585, filed Jul. 25, 1991, now U.S. Pat. No. 5,128,163, itself a continuation-in-part of application Ser. No. 07/696,807, filed May 7, 1992, now abandoned, which in turn is a continuation-in-part of application Ser. No. 07/523,762, filed May 16, 1990, now abandoned.

This invention relates to an apparatus and a method for forming edible shaped products, such as rings. In particular, this application relates to an apparatus and a method for forming a formable food mass, comprising onion pieces without a binder, preferably into simulated ring shapes. Such apparatus and method is suitable for a wide variety of food products, including without limitation, fruit, vegetables, meat, poultry, fish or dairy products and mixtures thereof in selected desired shapes.

BACKGROUND OF THE INVENTION

A popular way to prepare and serve onions is in the form of French fried onion rings. French fried onion rings have become so popular that they are now mechanically processed, packaged, and frozen in large quantities for use in restaurants and institutions, as well as in consumer size packages for home use.

Attempts have been made to solve the problem of increased cost due to sorting of unsuitable sizes and in subsequent processing and handling of such food products. The natural food is reduced to a chopped, powdered or other comminuted form and extruded mechanically as finely-divided products into a uniform shape. Normally, such extruded products are incapable of retaining shape and the comminuted food must be admixed with a gelling agent which, when treated, acts as a structure-forming matrix throughout the extruded shaped-food product. Such processes do not result in a fully acceptable product since the structure-forming matrix affects the texture, flavor and eating characteristics of the final food product.

Such automatic equipment is shown, for example, in U.S. Pat. No. 3,537,494 wherein fresh unpeeled onions are automatically peeled and sliced, and in U.S. Pat. No. 4,534,792, wherein the onion slices are further processed by being separated into rings of a desired size. In both of these machines, residual portions of the processed onions are generally surplus. Similarly, the onion ends and the small central portions or hearts of the onions are considered surplus and of limited use.

Methods of utilizing the residual portions of the onion for various purposes are known. Generally, these consist of reducing the onion pieces (known as edible onion material), as well as chopped whole onions, to a desired size and then mixing the same with a binder to create a formable food mass. Onion rings of the desired size are then made from the food mass containing binder material.

Preferably, automatic equipment is used to form the food mass into the desired shape. Food processing equipment is known for shaping an edible material into the desired size and configuration, including various forming and extruding devices such as an apparatus described in U.S. Pat. Nos. 3,650,765 and 3,650,766. The instant invention provides significant advantages in apparatus, method and product over the prior art to yield binderless, shaped food material, such as surplus edible onion matter.

SUMMARY OF THE INVENTION

It is therefore an object of this invention to provide a unique apparatus for forming rings from a formable food mass comprising only edible food matter, without a binder.

It is therefore another object of this invention to provide an improved and unique method for forming rings from a formable food mass comprising only edible food matter, without a binder.

It is a further object of this invention to provide an improved apparatus and method for forming rings, useful for processing into French fried onion rings, from formable, edible food matter comprising only pieces of onions, without a binder.

Also it is an object of this invention to provide an apparatus for forming onion rings from an edible food mass of onion pieces, without a binder, wherein the rings formed have a substantially true ring shape without undesirable deformations and without destroying the natural texture thereof.

It is a further object of this invention to provide an apparatus and method of forming binderless rings and other shaped forms from a food mass of edible food pieces, wherein the food mass, preferably onion pieces, is compressed into an annular ring opening in a horizontal slidable block member and the formed ring is discharged by a vertically movable split ring ejection member which is located adjacent to and above the annular ring opening in a discharge position whereby the formed onion ring is discharged from the slidable block member by a vertical pushing action.

It is another object of this invention to provide an apparatus and binderless method for forming rings from a formable edible food mass comprising onion pieces, wherein the apparatus and method is characterized by its effectiveness and efficiency in operation and result.

It is yet another object of this invention to provide an apparatus for forming rings from an edible, formable wherein the apparatus is characterized by high speed production, with resulting high quality and economical cost of the product.

Further purposes and objects of this invention will appear as the specification proceeds.

The foregoing objects are fulfilled by providing an apparatus which forms an edible product without a binder from a formable food mass which comprises, for example, onion pieces, wherein the apparatus includes a hopper for containing the chopped or other comminuted food mass, optionally cooled to a temperature of from about $-5°$ F. to about $5°$ F., means for portioning a charge of said food mass into substantially vertical cylindrical chamber having a cooperating movable ring piston and a horizontally movable slidable lower plate. Said lower plate having a ring shaped mold cavity for receiving the charge of said food mass. Optionally, said lower plate may have means for cooling to from about $-5°$ F. to about $5°$ F., more preferably to about $0°$ F.

Said ring-shaped mold cavity is formed in said slidably transverse movable lower plate with a rigidly supported center portion, said center portion connected by a connecting member to the outer portion of the lower plate such that the connecting member is offset above the open ring area. Thereby, the formed ring product has no indentions, separations or weak areas. A vertically moveable compression piston member is reciprocally mounted in the annular opening and an operating member is provided for reciprocating the movable member between the loading position and the compression position. The formed product is ejected from the ring cavity by a vertically movable, conforming-shaped member cooperating with the periphery of the ring cavity and internal to the annular ring cavity to discharge the compressed formed product, to assure that the formed product is properly separated and discharged from the ring cavity opening without substantial deformation.

The above brief description, as well as further objects, features and advantages of the present invention, will be more fully understood by reference to the following detailed description of the presently preferred and illustrative embodiment in accordance with the present invention, when taken in conjunction with the accompanying drawings.

BRIEF DESCRIPTION OF THE DRAWINGS

Particular embodiments of the present invention are illustrated in the accompanying drawings wherein:

FIG. 1 is a schematic view of an apparatus for forming binderless edible formed products in accordance with the present invention.

FIG. 2 is a plan view of a form pressed ring product in accordance with the present invention.

FIG. 3 is a cross-sectional view of the product illustrated in FIG. 2.

FIG. 4 is a side elevation view in cross-section of the apparatus of this invention, in the pre-compression stage.

FIG. 5 is a side elevation view of the apparatus of this invention, in the compression stage.

FIG. 6 is a top plan view taken along line 6—6 in FIG. 5 showing one embodiment of key-bar connecting member of the ring in the mold.

FIG. 7 is a side elevation in cross-section view of the device of this invention prior to compression of edible onion material in the mold and with one ring formed and in place for ejection.

FIG. 8 represents the cross-section of the preferred configuration of the key-bar.

FIG. 9 is a side elevation representing the sliding block with one onion ring discharged and a second onion ring compressed.

FIG. 10 is a top plan view similar to FIG. 6, showing another embodiment of the single key-bar connecting member of the ring mold.

FIG. 11 is a side elevation view of the apparatus of this invention with the preferred key-bar arrangement below the ring mold, in the compression stage.

FIG. 12 is a side elevation detailed view of the underneath ejection of the molded ring product and movement of the ring by the pusher onto a conveyor belt.

FIG. 13 is a top view of a pusher means interacting with a formed ring product.

FIG. 14 is a top plan view taken along line 14—14 in FIG. 11 showing one embodiment of the split ring configuration of an underneath ejection means for ejecting a formed ring product.

FIG. 15 is a side elevation in cross-section view of the device of this invention showing extensive channelling for cooling means throughout the sliding block.

FIG. 16 is a top plan view of sliding block showing extensive cooling means and flow pattern throughout the sliding block.

DETAILED DESCRIPTION OF THE INVENTION

In accordance with the apparatus aspect of the present invention, there is provided a cylindrical mold member having a compression piston cooperating with a hopper containing the formable food product optionally cooled to from about 20° F. to about 35° F. If pre-cooling is desired, the formable food product is preferably cooled to from about 35° F. to about 55° F., more preferably pre-cooled to from about 35° F. to about 50° F. The mold member has the following description according to this invention. The edible mass used for forming edible shaped food products, such as rings, is described as a formable food mass of onion pieces. Although the apparatus described has its preferred and most important application in making such products formed as onion rings, it is to be understood that the described apparatus with a desired mold shape modifications and method of this invention, can be used to make a variety of binderless, formed edible products of a selected size and shape from comminuted edible food material with a relatively high moisture or water content.

Referring specifically to the drawings and with particular reference to FIG. 1, there is generally shown a press apparatus 13 connected to a hopper 11 containing a comminuted edible food material. These parts are generally on a frame for supporting the operational elements of the apparatus. Rigidly mounted on the form, the superstructure supports the hopper 11 and the cooperating mold member 10 to receive the formable, comminuted food mass from the hopper 11 for charging into the mold cavity 15 in the mold member 10.

At the middle right hand portion of FIG. 1 is seen an output conveyor means, generally designated 12 which is supported in part by the frame, said conveyor serves to move the formed onion rings or like product from the lower discharge opening in slidable block member 22—for further processing, i.e., breading, freezing, frying, packaging, etc., depending upon the desired state of the finished product.

Referring again to the superstructure and the operational members, seen in FIG. 1, means in the form of a conduit or chute 16 and means for advancing the comminuted mass, as a screw feed 14, and means for mixing the same in the hopper to facilitate downward movement of the comminuted material through conduit 16 into the mold cavity generally designated 15 (and shown in a portion of FIG. 1). The mold cavity 15 can also be seen in the lower right hand portion of FIG. 4. Each mold cavity includes a compression piston 21, an otherwise rigid slidable block member 22, located in the lower portion of the mold cavity below and cooperating with the piston 21 and said slidable block member 22 having therein in a central core or boss 23 which with the remainder of the block member 22 forms an annular ring or recess 24 for receiving the comminuted material 33 charged into the mold member 13. The piston 21 serves to compact the comminuted mass while advancing the same toward the slidable block member 22 and into the annular ring 24.

FIG. 8 represents the inverted triangular cross-section of an alternative configuration of the key-bar offset 27. This configuration allows comminuted material to flow around the key-bar offset 27 and to fill the annular ring cavity 24 thereunder as seen in FIGS. 5, 6 and 10. A minimum of deformation occurs on the formed ring under the key-bar offset 27 upon compression. As an alternative configuration, the key-bar is extended over only one side of the annular ring cavity 24 space in the transfer sliding block member 22. However, as a result the open space will form a raised bridge or block of compressed comminuted material. The raised bridge or block of material is moved as the block member 22 slides out of the mold cavity 14. By the sliding action, the raised bridge or block of compressed comminuted material thereon is removed by a shearing action against the wall of the mold cavity. Optionally, a sharpened knife edge or shearing wire can be used to remove the raised bridge or block.

The most preferred key-bar offset configuration is seen in FIGS. 11 or 12 wherein the preferred key-bar offset is below the annular ring cavity 24. Ejection therefrom is with a pusher unit 39 from below as seen in FIG 12.

More significantly, in the preparation of onion rings the recessed ring cavity in the block member is formed by a circular center 23 connected to the outer portion 25 of the block member 22 by preferably a downwardly offset displaced connector bar or key 26. An annular ring cavity 24 is formed between the center portion 23 and the outer portion 25. The piston 21 moves downward and compacts the comminuted mass 33 into the annular ring cavity 24; such that, when the compressed ring 32 of comminuted material is formed preferably there are no undesirable deformations on the surface of the formed ring. Deformations on the formed ring are weak points that will cause the ring to break apart or fracture during post-formation steps and subsequent handling.

Referring now to FIGS. 4 and 5, the cylindrical mold piston 21 is seen to be cooperating with the upper mold cavity at the bottom 17 of said mold cavity 15, i.e., forming a portion of the lower end and discharge portion of the mold cavity. As seen in FIGS. 4 and 5, the cylindrical mold device 13 terminates at the transverse slidable block member 22 which slides within the lower portion 17 of the mold cavity 14. The piston 21 slides vertically within the cavity 15 and in close proximity to the walls thereof. The compression piston 21 is capable of moving in a vertical reciprocating manner for charging of the comminuted material 33 and compression thereof into a formed, edible mass.

The mold member 13 is in a condition to receive the formable mass, i.e., entering first into the interior of the hopper 11; then into the mold cavity 15 after the mold member 13 has discharged and removed the formed mass, e.g., the onion rings.

The cylindrical former carries an opposed mold member generally designated 51. Said opposed mold member 5 coincides with the ring cavity 24 in the transverse, slidable block member 22.

It is contemplated that the mold block member 22 may be provided in sets of plural individual members as can be appreciated for efficient continuous production. Further, the mold members are also chilled, such as by internal cooling means in the mold member at 41, in the lower portion of 42 and in the movable mold block member at 43, to be in condition to receive the chilled, formable material, i.e., entering into the interior of the hopper. When operated in sets, other cylindrical mold members are in position to receive formable material, while mold members are in position to discharge and eject the formed, shaped products, e.g., onion rings.

As can be appreciated from FIG. 7, the ring assembly piston 21 of the mold member 13 is retracted incident to receiving a charge of optionally chilled, formable mass from the hopper 15 while the compression piston 21 of the mold member 13 is withdrawn vertically so as to position the formed mass for shear removal and deposit onto the conveyor 12.

After introducing the formable mass into the mold member 13, the cylindrical compression piston 21 closes the opening to the mold cavity 15 and the periphery of the cylindrical piston 21 engages and movably seals about the perimeter of the opening 20. It will be appreciated that after the cylindrical piston 21 has reached the maximum compression, the direction of the piston is reversed, i.e., the slidable (ring) block member 22 of the mold member 13 will be retracted while that of the slidable block member 22 will be extended horizontally to a discharge position. More precisely, the mechanism is provided which causes an extension of each ring assembly 24 with the formed chilled ring 30 in place. The formed ring 30 is then ejected either upwardly from below as in FIG. 12 or downwardly from above as in FIGS. 1, 7 and 9 by a vertical motion of a split ring ejection member 40 as the split ring interacts with the formed ring 32 in the annular ring cavity 24 in the slidable block member 22.

Each reciprocating compression piston assembly 10 includes a horizontal slidable block member 22 with a ring cavity portion 24 which slides within the lower portion 17 of the cavity mold 10 and in close proximity to the walls thereof. A connecting rod or key 26 is rigidly secured to the interface of the center portion, known as the central spacer 23, of the ring assembly and extends in an offset configuration and horizontally to the outer portion of the slidable block member either above, or preferably below the slidable block member. An offset cross bar (key) 26, relative to the molding members 15 and 22, interconnects the circular center portion 23 to the outer portion 25 of the slidable block member 22 as seen in FIGS. 4-12.

Preferably the position of the offset for the connecting rod or key is below the block member 22, FIG. 11. In this configuration the connecting rod or key 26 does not interfere in any manner with the filling, compression and ejection of satisfactory, ring-shaped, formed products. With this preferred configuration, the initial restraint of the connecting rod or key in an obstructing upward offset position is overcome. Hence, the elimination of the resulting effect which causes the formation of undesirable indentions or deformations on the surface of the ring-shaped product.

Further description of the hopper, and drive mechanism for the forming pressure to the compression piston and handling mechanism of the formed product will be dispensed with, in that these are commercially available in conventional units which heretofore have been used extensively in the manufacture of various formed food products such as patties, nuggets, tenders, strips, cylinders, rings and many other formed products.

Reference is now made to the description of the compression and ejection sequence, which in the preferred embodiment results in ring-shaped objects which include chilled comminuted material which maintains the shape for additional processing including coating, dipping, etc. At the start of the compression sequence, the optionally chilled, comminuted material is charged from the hopper into the cylindrical compression chamber. As the unitary compressed item is formed, the comminuted material is formed into a ring in the ring cavity in the cooled, horizontally movable block 22. After formation, the ring cavity in the block 22 is moved horizontally beyond the cylindrical compression chamber FIG. 12. Once moved horizontally beyond the chamber, the ring cavity portion of the slidable block member containing the frozen, molded, shaped material is engaged by a corresponding vertical pusher 39.

The pusher 39 ejects the frozen, formed item 32 from the mold cavity 24 in the slidable block 22. The ejection may be above or below. Once the frozen, formed product is ejected from the mold cavity by an upward pusher 39, there is engaged with the ejected, formed product a means for moving the ejected, formed product 47 to a conveyor means or the like to transport the formed product for further processing. Devices such as a sweep arm, wipe arm, a pusher arm or the like may be used to move the ejected, formed product on to the conveying means. The ejected item is placed on a conveyor belt or the like for further handling in post-forming processing. The time period from ejection to further handling is relatively short. Usually further processing following formation is begun within about one minute in order to keep the formed, frozen material in the compressed form and to form an envelope or other shape-retaining means around the item. In essence, the forming and ejection device is a single-stroke, double-form, double-discharge, shuttle action mechanism.

Following ejection, the slidable block member 22 is retracted under the vertical cylindrical mold member 15. It is contemplated to provide one or more slidable block members having mold cavities therein. Said mold cavities sequentially in turn cooperate with the cylindrical mold members to receive a charge of optionally moldable comminuted material, while at the same time a formed item is being ejected.

In accordance with the method aspects of the present invention, there is provided a method to prepare a formed compressed food product without a binder present therein. The food mass is a chopped or comminuted food material having a relatively high amount of moisture present therein as combined moisture. The comminuted food material is chilled or cooled from about −5° F. to about 5° F. in a mold cavity, preferably cooled to from about −5° F. to about 0° F. A portion of the optionally chilled formable material is charged into the vertical, cylindrical mold member. The charge of formable, comminuted material is compressed into a ring or other elemental-shaped cavity under sufficient pressure to retain the shape thereof. The frozen formed product is discharged from the mold cavity. Upon completion of the discharge, the final shaped product is coated or immersed in a bath to form an envelope therearound to hold the shaped product when processed further, as in a frying process.

Further, it is preferred to lower the temperature of the movable block member 22. For this purpose it was found advantageous to prepare a channeling system 43 as shown in FIG. 16 throughout the block member 22. Such a channeling system may be accomplished by gun-drilling the solid block member 22. The block member 22, the central spacer 23 and the connecting rod of key 26 are interconnectively and extensively channeled to enable circulation of a cooling media, such as liquid nitrogen, therethrough. Preferably the members 22, 23 and 26 are made of stainless steel. The stainless steel is machined and welded to allow control of the surface temperature of the members. Circular grooves or channelling 43 are cut around the ring-forming cavity both on the inside (inner core) and the outside (the block).

With the circulating cooling media there is more concentrated cooling around the ring-forming section during the formative stage of the compression of the molded, shaped item in the sliding block member 22. The circular groves 43 allow the cooling to be controlled at the area where the forming of the ring occurs. In addition, with the cooling media in the central spacer 23 through channeling in the connecting rod or key 26, one is able to more uniformly cool the forming material and shorten the cycle time, thus increasing the production rate for the compressed items.

The gun-drilling technique of preparing the coolant carrying channels 43 in the solid block member of 22 is satisfactory to permit introduction and circulation of cooling medium therethrough.

By cooling the block member in this a way the comminuted food material need not be chilled or cooled to a low temperature prior to introduction into the compression block. Additionally, by chilling or cooling the block member 22 the molded product, such as onion rings, can be formed more readily and uniformly. By using the cooled moving block member 22, pre-chilling or pre-cooling of the comminuted, blanched food material is not necessary. That is, prechilling to from about 25° F. to about 35° F. of the blanched, comminuted material is an optional step in the process. It is sufficient for the blanched comminuted material to be cooled to from about 35° F. to about 55° F. The cooled mass is placed into the chilled or cooled upper mold cavity 15 for introduction and compression in the mold ring cavity 24 in the block member 22, wherein final cooling to the form-setting compression temperature of from about −5° F. to about 5° F. is achieved by the circulation of the cooling fluid.

METHOD OF THE INVENTION

The method of the invention may be employed to form a wide variety of novel, prepared food items in various shapes without a binding agent. Thus, in addition to the formation of onion rings, the method disclosed herein is applicable to the formation of fruits, vegetables, meat, poultry and the like, and mixtures thereof, of any desired shape. Although the use of naturally occurring foods as a starting material is a preferred form of the invention, the method described and claimed herein also may be applied to form artificial food products by employing artificial flavors and edible bulk-forming materials without a binder.

Regardless of the nature of the food material selected as a starting material, it is first formed into a comminuted flowable, such as a slurry or other particulated flowable form. The only ingredient is the formed food product or particles thereof in a powdered, shredded, chopped, pulverized or otherwise comminuted form, for example, chopped onions. No additional binding agents are added to the mass of finely-divided food to give it a multiple and binding consistency. However, certain additives and flavor enhancers may be added, for example, artificial flavors corresponding to the flavor of the natural food product to ensure uniformity of taste; seasonings such as salt, pepper and the like; artificial sweetners; coloring agents; and preservatives. No gel-forming material for shape retention of the outer structure or skin formation on the formed mass is necessary.

Prior to compressing the comminuted material into the desired shape, the food material is preferably treated by the following steps. Assuming the material to be form molded into desired shapes is not in a suitable comminuted form, the material is first chopped or treated so as to obtain small or reduced particle sized material. The thus comminuted material as in the case of onions, is then blanched in water at about 150° F. for about 20 seconds. Optionally, the blanching step can be followed by rapid chilling immersion in ice water at from about 35° F. to about 55° F. At this point in the pretreatment procedure, a large volume of water becomes associated with the blanched, comminuted material. It is then necessary to remove the excess water as by centrifugal force and spinning the material.

When the blanched, comminuted material is essentially free of uncombined water, the material is considered ready for chilling to from about −5° to about 5° F. By "essentially free of uncombined water" is meant the comminuted material has the natural moisture from the blanching process. The latter is considered "uncombined water". The amount of desired moisture content for the comminuted material can be determined by measuring the moisture as with a moisture balance. In addition, the desired moisture content will be determined by the texture desired in the final product. As with onion rings, a relatively high moisture content in the blanched comminuted material will produce cooked product which is soft and unacceptable. Therefore, removal of excess moisture prior to compression is preferred.

Chilling or cooling of the comminuted food mass in the form mold during compression from about −5° F. to about 5° F., preferably from about −5° F. to about 30° F., is a critical feature of this aspect of the invention. Further, maintenance of the mass in the form mold at this temperature is desirable. Rapid handling of the formed product in post-forming procedures is also necessary, since warming of the formed product will weaken it and cause the product to fragment. While intact in the desired form, the material can be further treated as by applying an envelope-forming material thereto and treatment as by heating, frying or baking. However, it is contemplated that cooling after a post-forming treatment can be used to set the enclosure about the formed product (such as dipping in hot, melted chocolate). The nature of the coating or covering placed on the material will depend upon the desired nature of the formed product.

It has been found that the chilled, molded product from the comminuted food mass can be further strengthened prior to further handling by misting the chilled product immediately after ejection from the mold with cold water, as shown in FIG. 12. It is therefore a preferred step in the process of this invention to mist with cold water the chilled product immediately after ejection from the form cavity prior to the additional and further steps of applying an edible coating and cooking.

In one method of forming the envelope or surface coating of the formed product, the heretofore described comminuted food mass is molded under cold temperature (approximately −5° F. to 5° F., preferably from about −5° F. to about 0° F.), removed from the mold and immediately dipped into a batter, then breaded with bread crumbs, a second batter, and then fried. Optionally, a second coating of fine bread crumbs may be applied to the coated, uncooked product. The formed product coated with the batter and bread crumbs produces a product shaped as originally formed, and remains intact and confines the food particles which make up the product so the product may be subsequently processed in various steps. Moreover, in the preferred embodiment, the contact time and handling time between the ejection from the molding apparatus and the source of the form-setting envelope is of relatively short duration. Typically, handling times would range between one second and two minutes, although longer contact times may be used if necessary if the formed product is continually kept at a cold temperature between from about −5° F. to about 5° F., more preferably from about −5° F. to about 0° F.

FIG. 1 also schematically illustrates the manner in which the formation and processing of a fried food product, for example, such as an onion ring, may be carried out. The formable mass is introduced from the hopper through the conduit—to the chilled mold cavity. In the chilled mold cavity the food mass is compressed to the desired form and then ejected.

Upon completion of the breading and coating procedure, the formed food material may be cooked, for example, by passing through a fryer on the conveyor to form a crisp outer coating and stabilized inner core of the cooked food product in intimate contact with each other.

Examination of the inner core reveals a crisp outer coating and an inner core of cooked onion food product in the complete absence of any internal binding matrix or other gel coating or skin on the surface of the ring.

It is contemplated that the comminuted food materials will have sufficient moisture present to form the appropriate frozen mass when the compression is applied to the chilled material in the ring mold. If, for example, insufficient moisture is present to form satisfactory frozen shaped products, after mechanically spinning to remove the excess water, it may be necessary to add from about 1 percent to about 10 percent water to the chilled, comminuted material immediately prior to the forming process.

For further products, formulations and uses of the present apparatus and process, reference is made to said discussions incorporated herein above. A variation of modifications, changes and substitutions is intended in the foregoing disclosure. Accordingly, it is appropriate that the appended claims be construed broadly and in a manner consistent with the spirit and scope of the present invention.

What is claimed is:

1. An apparatus for forming edible products from formable, edible, comminuted material comprising in combination:
   (a) a hopper for containing comminuted, edible material and means for chilling said material;
   (b) a substantially vertical mold cavity cooperating with said hopper to receive comminuted, edible material, said cavity having an upper inlet opening and a lower outlet opening;
   (c) a substantially vertical, movable compression piston mounted for reciprocation within said cavity; means for reciprocating said compression piston between a retracted position when said chamber is being charged with said comminuted material and an extended position when said comminuted material is compressed through said lower outlet into a horizontally retractable sliding block;

(d) said horizontally retractable sliding block having at least one shaped-form cavity formed therethrough cooperating with said lower outlet;
(e) means for horizontally sliding said block to a position exterior to said mold cavity lower outlet; and
(f) means for cooling said sliding block cavity from about −5° F. to about 5° F.; and
(g) means for ejecting frozen, compressed material from the form cavity when said block is positioned exterior to said lower outlet.

2. Apparatus for forming edible products from formable, edible, comminuted material comprising in combination:
(a) a hopper for containing said comminuted, edible material and means for chilling said material from about 25° F. to about 35° F.;
(b) a substantially vertical cavity cooperating with said hopper to receive the comminuted material, said cavity having an upper inlet opening and a lower outlet opening;
(c) a movable compression piston mounted for reciprocation within said cavity, means for reciprocating said compression piston between a retracted position when said chamber is being charged with said comminuted material and an extended position when said comminuted material is compressed into a lower outlet opening cooperating with a horizontally retractable sliding block;
(d) said horizontally retractable sliding block having a shaped-form cavity formed therethrough by an outer portion and a rigidly supported, smaller center portion, said center portion connected to said outer portion by a non-interfering offset means for connecting the center and outer portions;
(e) means for horizontally sliding said block to a position exterior to said cavity lower outlet; and
(f) means for ejecting frozen, compressed material from the form cavity when said block is positioned exterior to said lower outlet.

3. The apparatus according to claim 2 wherein said sliding block includes means for chilling said sliding block to maintain a temperature of from about −5° F. to about 5° F. in said sliding block during compression.

4. The apparatus according to claim 2 wherein said means for ejecting the frozen, compressed material from the form cavity is a vertical, reciprocally movable, split ring-shaped member cooperating with said form cavity.

5. The apparatus of claims 1 or 2 wherein the offset means for connecting said center portion to said outer portion in the horizontal sliding block is with an offset connected to and positioned below the sliding block.

6. The apparatus of claim 5, wherein said center portion is a solid, substantially circular member and said outer portion is substantially circular and having a larger diameter thereby forming a ring therebetween.

7. The apparatus of claim 1, wherein the horizontally retractable sliding block has means for extensive cooling throughout said sliding block.

* * * * *